(12) United States Patent
Chun et al.

(10) Patent No.: US 7,730,528 B2
(45) Date of Patent: Jun. 1, 2010

(54) INTELLIGENT SECURE DATA MANIPULATION APPARATUS AND METHOD

(75) Inventors: Jon Andre Chun, Emeryville, CA (US); Stephen Dao Hui Hsu, Eugene, OR (US); James Noshir Hormuzdiar, Danbury, CT (US)

(73) Assignee: Symantec Corporation, Mountain View, CA (US)

( * ) Notice: Subject to any disclaimer, the term of this patent is extended or adjusted under 35 U.S.C. 154(b) by 1394 days.

(21) Appl. No.: 09/956,730

(22) Filed: Sep. 19, 2001

(65) Prior Publication Data

US 2002/0184527 A1 Dec. 5, 2002

Related U.S. Application Data

(60) Provisional application No. 60/295,240, filed on Jun. 1, 2001.

(51) Int. Cl.
*H04L 29/02* (2006.01)
(52) U.S. Cl. .............................................. 726/12; 726/3
(58) Field of Classification Search ......... 713/153–154, 713/168, 182, 201
See application file for complete search history.

(56) References Cited

U.S. PATENT DOCUMENTS

| | | | |
|---|---|---|---|
| 5,528,503 A * | 6/1996 | Moore et al. ................... | 700/95 |
| 5,550,984 A | 8/1996 | Gelb | |
| 5,621,796 A | 4/1997 | Davis et al. | |
| 5,935,212 A | 8/1999 | Kalajan et al. | |
| 5,946,674 A | 8/1999 | Nordin et al. | |
| 5,961,593 A | 10/1999 | Gabber et al. | |
| 5,987,480 A | 11/1999 | Donohue et al. | |
| 6,002,767 A * | 12/1999 | Kramer ....................... | 705/79 |
| 6,003,084 A | 12/1999 | Green et al. | |
| 6,029,245 A | 2/2000 | Scanlan | |

(Continued)

FOREIGN PATENT DOCUMENTS

EP 1091536 4/2001

(Continued)

OTHER PUBLICATIONS

Abadi et al, Secure Web Tunneling, Proceeding of the 7$^{th}$ Internl. World Wide Web Conference, Apr. 1998, Computer Networks and ISDN Systems, vol. 30, No. 1-7 (Apr. 1998), pp. 531-539, Retrieved from the Internet on Oct. 9, 2005 <URL: http://birrell.org/andrew/tunnel/>.*

(Continued)

*Primary Examiner*—Minh Dinh
(74) *Attorney, Agent, or Firm*—Meyertons Hood Kivlin Kowert & Goetzel, P.C.

(57) ABSTRACT

A data manipulation appliance can be installed or plugged into a computer network between business partners, and can perform many of the difficult and tedious data manipulation operations in a substantially automated manner. Examples of operations that can be performed by an embodiment of the apparatus include, but are not limited to, encryption, authentication, auditing, shaping data to a common intermediate format for exchange between partners, other auditing of data exchanges in transaction logs, filtering data for privacy compliance and risk management, error detection and correction, mapping internal non-standard data elements to external standard code sets, proxy and protocol re-writing, and so on. The appliance can be embedded with various tools to perform these operations, and therefore appears to be "intelligent."

24 Claims, 4 Drawing Sheets

U.S. PATENT DOCUMENTS

| | | | |
|---|---|---|---|
| 6,032,260 | A | 2/2000 | Sasmazel et al. |
| 6,047,268 | A | 4/2000 | Bartoli et al. |
| 6,081,900 | A | 6/2000 | Subramaniam et al. |
| 6,137,884 | A | 10/2000 | Micali |
| 6,144,638 | A | 11/2000 | Obenhuber et al. |
| 6,161,139 | A * | 12/2000 | Win et al. .................. 709/225 |
| 6,182,095 | B1 | 1/2001 | Leymaster et al. |
| 6,199,113 | B1 | 3/2001 | Alegre et al. |
| 6,256,739 | B1 | 7/2001 | Skopp et al. |
| 6,289,462 | B1 | 9/2001 | McNabb et al. |
| 6,345,303 | B1 | 2/2002 | Knauerhase et al. |
| 6,351,772 | B1 * | 2/2002 | Murphy et al. .............. 709/227 |
| 6,389,462 | B1 | 5/2002 | Cohen et al. |
| 6,401,125 | B1 | 6/2002 | Makarios et al. |
| 6,460,076 | B1 | 10/2002 | Srinivasan |
| 6,502,106 | B1 | 12/2002 | Gampper et al. |
| 6,502,135 | B1 | 12/2002 | Munger et al. |
| 6,507,908 | B1 * | 1/2003 | Caronni ...................... 713/153 |
| 6,704,873 | B1 * | 3/2004 | Underwood ................ 713/201 |
| 6,708,200 | B1 | 3/2004 | Ura et al. |
| 6,721,424 | B1 | 4/2004 | Radatti |
| 6,779,111 | B1 | 8/2004 | Gehrmann et al. |
| 7,111,060 | B2 * | 9/2006 | Araujo et al. ............... 709/224 |
| 2002/0069366 | A1 * | 6/2002 | Schoettger .................. 713/201 |
| 2002/0133706 | A1 * | 9/2002 | Khanna et al. .............. 713/182 |
| 2002/0159601 | A1 * | 10/2002 | Bushmitch et al. .......... 380/277 |
| 2004/0230820 | A1 | 11/2004 | Hui Hsu et al. |

OTHER PUBLICATIONS

Birrell et al., "Pachyderm", Mar. 1997, Retrieved from the Internet on Jan. 23, 2008: <URL: http://www.wobber.org/ted/cv/pachyderm.pdf>.*

Sato, "Basic Technique And Application for Internet Firewall—DelegGate Structure" (formal translation), Computer Software, Jan. 1997.*

PCT International Search Report for International Application No. PCT/US02/16866.

Aventail Corporation Tech Brief, "Proxy Architecture Versus Direct Connect," Apr. 2001.

PCT/US01/40812, PCT Search Report, Apr. 9, 2002.

Wu, Sun et al., "Virtual Proxy Servers for WWW and Intelligent Agents on the Internet," IEEE, 1997, pp. 200-209.

Newton, Harry, "Newton's Telecom Dictionary," Telecom Books, 14th Edition, 1998, p. 260.

Kim, Joo-Yong et al., "A Proxy Server Structure and its Cache Consistency Mechanism at the Network Bottleneck," IEEE, 1999, pp. 278-283.

Greene, Tim, "Access Control Software on tap from Neoteris," Network World, vol. 18, No. 45, Nov. 5, 2001, pp. 23-24.

Farah, M., "Encrypted Hypertext Transfer Protocol—UGGC/1.0", Network Working Group, Apr. 1, 2000, pp. 1-5.

"Anonymizer URL Encryption," http://www.anonymizer.com, Nov. 27, 1999.

"How to Use Anonymizer Surfing," http://www.anonymizer.com, Mar. 2, 2000.

"Ezproxy: A Remote User Athentication Tool for Libraries", Status Line, Nylink, No. 142, May 2000, p. 9.

"Mc; McConnell Columns," Radford University, vol. 7, No. 4, Apr. 2000, p. 3.

Official Communication in Application No. 2003-501886, Mailed Feb. 6, 2007.

Sato, Yutaka, "Basic technology for an internet firewall and applications thereof: Mechanism of DeleGate", Computer Software, Japan Society for Software Science and Technology, Jan. 16, 1997, vol. 14, No. 1, pp. 55-63.

Suto, Kenji, "Aventail ExtraNet Center", Software Design, Gijutsu Hyoron K.K., Dec. 18, 2000, No. 122, pp. 216-219.

Kawai, Yasuhiro, "Facilitating cooperation in the two fields of BtoB integrated servers and converters; Increase in the number of products for selection", Nikkei Internet Technology, Nikkei Business Publications, Inc., Feb. 22, 2001, No. 44, pp. 18-20.

Ando, "XML product for BtoB EC: Movements in the two fields of BtoB integrated servers and converters; Increase in the number of products for selection", Nikkei Internet Technology, Oct. 22, 2000, No. 40, pp. 162-171.

Supplementary European Search Report for European Application No. EP02737242, mailed November 2, 2009, 3 pages.

* cited by examiner

INTELLIGENT SECURE DATA MANIPULATION APPARATUS AND METHOD

CROSS-REFERENCE TO RELATED APPLICATION

The present application claims the benefit of U.S. Provisional Application Ser. No. 60/295,240, entitled "INTELLIGENT DATA MANIPULATION APPARATUS AND METHOD," filed Jun. 1, 2001 and incorporated herein by reference.

TECHNICAL FIELD

This disclosure relates generally to the exchange of electronic data over a generally insecure communication network, and in particular but not exclusively, relates to the secure exchange and the manipulation of data (including static data, dynamic data such as email and instant messaging, and the access to applications that manipulate such data at a higher level) being provided over the communication network.

BACKGROUND

As technology advances in today's society, many tasks that were traditionally performed manually can now be performed automatedly via the use of computers. An example is electronic commerce or "e-commerce" that allows consumers to purchase goods and services via the Internet. With e-commerce, consumers and merchants rely on the secure exchange of accurate electronic data.

Other examples of exchanges of electronic data include business-to-business relationships where one business contracts with another business to manage a particular component of its operation. For instance, a business may outsource with a third-party organization to manage its payroll and benefits. In such an affiliation, the business typically provides the third-party organization with remote access to its confidential electronic information (e.g., data stored in databases and file systems, as well as applications to manipulate such data) to allow the third-party organization to process the information.

Yet other examples where electronic data can be exchanged are with systems that try to comply with the Health Insurance Portability and Accountability Act of 1996 (HIPAA). HIPM compliance mandates a national Electronic Data Interchange (EDI) framework that standardizes private electronic health information so it can be securely shared in a largely automated manner between health care providers, employers, insurers, patients, and other authorized parties. Thus, an insurer can access patient records at a hospital in order to verify treatment and coverage for a particular patient, for instance.

Virtual private networks (VPNs) have been used as one technique to securely exchange data between remote systems (where the term "systems" herein includes data exchanges between computer to computer, computer to human, human to human, or any variation thereof). With a VPN, a secure network overlays an insecure public network, such as the Internet. A VPN is created by encrypting all data streams between selected nodes on the larger public network, such that no other nodes on the same public network can access the confidential data.

These examples of VPN data exchange systems suffer from a number of drawbacks. First, many of them can only understand, analyze, and act according to external data stream information and not the actual contents of the data stream. For example, traditional VPNs monitor incoming and outgoing packets, block incoming packets based upon source or destination, and require some authentication information in order to establish a secure connections to authorized data. However, once a secure connection is established the VPN is largely ignorant of the content of the data being exchanged. The most such systems can do is blindly record the data exchanged without the ability to intelligently act upon it in real time.

Another disadvantage of these VPN data exchange systems is that data will often need to be exchanged between machines (such as between computer systems, client terminals, application software, servers, web browsers, and the like) that communicate via different or incompatible data formats and protocols. In the payroll and benefits scenario described above, and individual in the business may need to re-format the data to a format (e.g., to a compatible software application file, database layout, intermediate file format, and so on) before the data is sent to the third-party organization, so that the third-party organization can read and process the data. A web browser generally only understands the webbased protocols, such as hypertext transfer protocol (HTTP) and hypertext transfer protocol secure (HTTPS), and thus cannot exchange data with an email server that communicates via the other protocols, such as SMTP, POP, and/or IMAP protocols. This translation between data formats and protocols may need to be done differently and manually on a case-by-case basis for each data exchange link, thereby adding to the complexity and inefficiency of the process.

Yet another problem with these VPN data exchange systems is that erroneous data can be cumbersome to detect or correct. Correction of incorrect data, if such incorrect data is even located to begin with, typically involves having to track down specific static database or file system entries where the original error occurs. This can be difficult in situations where there are multiple databases having different formats. In addition, data that is exchanged often needs to be logged in terms of source, destination, date and time, or other transactional tracking information. This transactional information is also generally stored statically in databases, file systems, or other storage locations (e.g., "data at rest"), and can easily become outdated or erroneous if the original data had errors. Erroneous data can result in severe consequences, particularly in the health care field where a wrong prescription number for a medicine may cause great harm to a patient. If left uncorrected, erroneous data can propagate and proliferate through various systems and databases as the data is exchanged.

Specific software packages and general application server platforms have been developed to address some of the more sophisticated problems of data analysis, integration, and exchange. This software approach to data exchange usually provides some advanced programming environment whereby functionality can be customized to analyze, manipulate, and audit data according to the unique business flow and data architecture of each customer.

These examples of software data exchange systems suffer from a number of drawbacks. First, security at all levels is usually a prerequisite for data exchange but generally only exists at the application layer in such software systems, such as in the form of login username and passwords. Because encryption is so computationally costly and poorly done in software alone, these systems are either inefficient or unable to secure significant data exchanges at the lower packet level. Often, security must be addressed separately at the application, operating system, network level, and overall integration levels.

In addition, software is just one component of an overall working data exchange system. Hardware must be independently researched, purchased, configured, and managed along with the software package. Both the hardware (including the operating system) and software must be integrated for security, performance, automation, etc., which represents a significant continual effort. Moreover, such software data exchange systems are usually tied to a back-end local data store operating on data at rest. Once data is initially extracted, it can be copied and exchanged many times independent of such systems, thereby undermining core functionality such as comprehensive auditing and privacy filtering.

Accordingly, improvements are needed in data exchange techniques.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Figure 1:
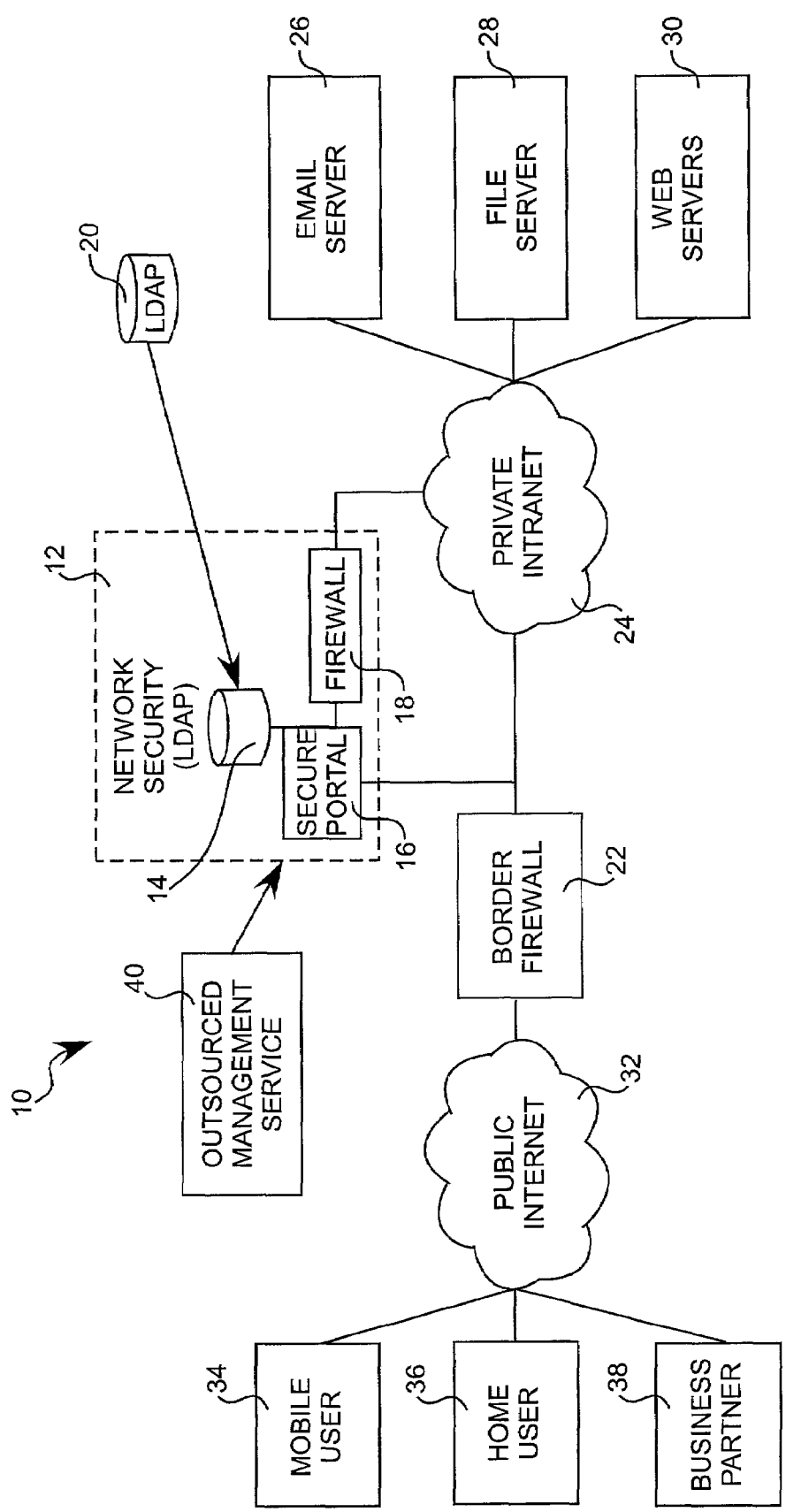
FIG. 1 illustrates an example of a system that can implement an embodiment of an intelligent data manipulation apparatus.

Embodiments of an apparatus and method for intelligent data manipulation are described herein. In the following description, numerous specific details are provided, such as examples of protocols and network components, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides an apparatus in the form of an appliance that can be installed in an existing network. The appliance comprises a single modular device that is less expensive than existing techniques/systems, yet more comprehensive in addressing data exchange issues, more robust, less complicated to manage, and so on. An embodiment of the appliance thoroughly integrates security to allow the appliance to be located at a network gateway where all incoming and outgoing data exchanges must pass through. This ensures that no data can be exchanged externally without the knowledge and opportunity to monitor and manage the data. This network gateway location also makes it easier to centralize, secure and globally monitor, and manage all external data exchanges.

An embodiment of the appliance can be installed or plugged into a computer network between business partners, and can perform many of the difficult and tedious data manipulation operations in a secure, transparent, and substantially automated manner. Examples of operations that can be performed by an embodiment of the apparatus include, but are not limited to, encryption, single sign-on authentication, auditing, shaping data to a common intermediate format for exchange between partners, other auditing of data exchanges in transaction logs, filtering data for privacy compliance and risk management, error detection and correction, mapping internal non-standard data elements to external standard code sets, proxy and protocol re-writing, and so on. An embodiment of the apparatus is embedded with various tools to perform and customize these operations, and therefore appears to be an "intelligent" device.

An embodiment of the apparatus is also provided with remote or local configuration, management, and rules-based data manipulation programming capabilities. The data can be transformed according to fixed data manipulation rules or programmable data manipulation rules. The data can be manipulated while the data is in transit (e.g., "while on the wire") and need not be restricted to being manipulated only while in back-end static storage locations, such as databases, file systems, or storage unit.

Referring first to FIG. 1, shown generally at 10 is an example of a system that can implement an embodiment of the invention. More specifically, FIG. 1 shows an embodiment of an intelligent data manipulation apparatus 12 installed in the system 10. The apparatus 12 may be physically implemented in one network device in one embodiment, or several distinct dedicated network appliance devices may be implemented in another embodiment (where the dashed lines of the appliance 12 in FIG. 1 indicates a functional grouping of these devices rather than a physical boundary). For purposes of explanation, the apparatus 12 can be thought of as including a network security database component 14 or the ability to communicate with an external network security database component 20, a secure portal 16 (which can have built into it a multi-protocol gateway functionality), and an optional distinct firewall device 18. The network security database component 14 can be based on a Lightweight Directory Access Protocol (LDAP) framework 20 in one embodiment. Additional detailed descriptions of the components 14-18 (or analogous components to perform similar operations) will be provided later below with reference to FIG. 2 and the subsequent flowcharts.

The apparatus 12 can be coupled in parallel as shown in FIG. 1 or in series between a border firewall 22 and a private intranet 24 (or other network), both of which typically form part of a business' computer system. The private intranet 24 can in turn be coupled to or include an email server 26, a file server 28, other web servers 30, or other web-based or non-web-based types of applications or data stores (not shown). The email server 26 includes email applications (and related files) that allow users/employees to electronically communicate with each other (or with persons, systems, or web sites outside of the business' premises) using standard email protocols (such as SMTP, POP, IMAP, and the like). The file server 28 includes files stored on various operating systems and accessed directly or indirectly by distinct network access protocols (such as SMB, NFS, and the like) that allow individuals to internally or remotely access stored data, files, via a web-based application (such as a browser) or via other techniques. The web server 30 can include files, data, or software related to human resources (HR), payroll, reporting, transactions, collaboration, or other aspects related to operation of the business. In an embodiment, the apparatus 12 is useful in that it may be accessed through web-based or browser-based devices. It is to be appreciated that these aspects are merely illustrative, and that in some embodiments, web-based components need not necessarily be used.

Via the border firewall 22 coupled to a public Internet 32, machines (e.g., client terminals, PCs, servers, applications, and the like) of the business can communicate or exchange data with external parties. Examples of such parties include a mobile user 34 that can communicate with the business via wireless devices, a home user 36 that uses a personal computer (PC), or a business partner 38 that has machines (e.g., client terminals, PCs, servers, applications, and the like) that exchange information with the machines on the other side of the border firewall 22.

Another party, such as an outsourced management service 40, can also be provided with access to the business' computer system. Examples of the outsourced management service 40 can include a service to manage the business' specific software applications payroll, benefits, and the like, or more general services such as network security and data exchanges. In the embodiment of FIG. 1, the outsourced management service 40 is shown as being in direct communication with the apparatus 12. It is to be appreciated that in other embodiments, the outsourced management service 40 can communicate with the apparatus 12 via the public Internet 32, via dedicated dial-up lines or via dedicated communication lines.

While FIG. 1 shows an example of a specific configuration for the system 10, it is understood that FIG. 1 only shows one possible embodiment of the system 10. In various other embodiments, components of the system 10 can be distributed across multiple networks. Additionally, there may be more than one apparatus 12 in the system 10. For instance, the business partner 38 and/or the outsourced management service 40 may have their own apparatus 12, which in turn can communicate with other apparatus 12 in the system 10.

Figure 2:
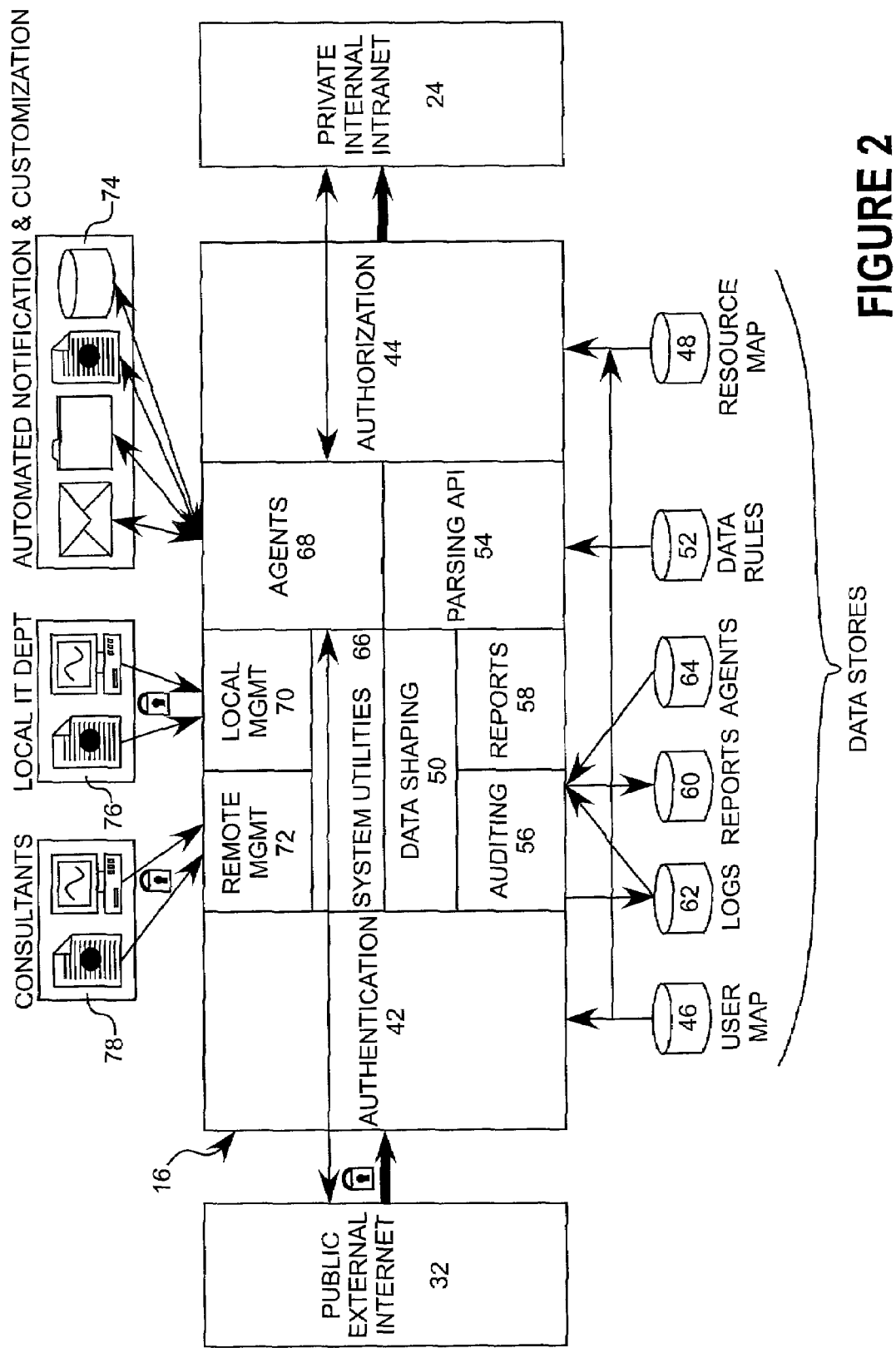
FIG. 2 is a block diagram of an embodiment of a portion of an intelligent data manipulation apparatus for the system of FIG. 1.

FIG. 2 is a block diagram of an embodiment of a portion of the apparatus 12 for the system 10 of FIG. 1. More specifically, FIG. 2 is a block diagram showing components of the secure portal 16 of the apparatus 12, as well as other components of the system 10. The apparatus 12 can be "plugged-into" a network (e.g., the business' computer system) with minimal or no re-configuration of the network needed. Network cards of the apparatus 12 may be configured as necessary in a manner similar to other network devices.

In one embodiment, the apparatus 12 is installed between the public Internet 32 and the private intranet 24, thereby allowing all incoming and outgoing data (e.g., data being exchanged between machines) to be routed through the apparatus 12 and the optional distinct firewall device 18 to be managed as a part of the entire data exchange system within the apparatus 12. It is noted that the apparatus 12 does not have to be in-line/in series with the border firewall 22 and the private Intranet 24 to sniff all data being exchanged—an embodiment of the apparatus 12 can accomplish this from the parallel position. Some of the various communications/connections in FIG. 2, which may be secured, are indicated by "padlock" symbols.

The apparatus 12 can be provided with 2 GB of synchronous dynamic random access memory (SDRAM) and network interface cards (NICs), as an example. One illustrative embodiment of the apparatus 12 can have up to four NICs or network connection devices: 1) facing external network, 2) facing internal network, 3) facing internal data stores streaming in/out data like audit, etc., 4) dedicated local administration (potentially a modem). Additional non-limiting and non-exhaustive examples of encryption acceleration cards, modem, operating system, browser, server, and other such components of the apparatus 12 and/or with which the apparatus can operate are disclosed in the priority provisional patent application from which the present application claims priority and incorporates by reference. Additional features of various embodiments of the apparatus 12 are also disclosed in this provisional patent application.

The apparatus 12 includes an authentication module 42 and an authorization module 44, both of which may use part of the network security database component 14 as a data store for a user map 46 and a resource map 48 to perform security operations (e.g., comprise part of a security module to control the exchange of electronic data). The secure portal 16, in one embodiment, comprises a system utilities module 66. Initial configuration of the apparatus 12 so as to provide security capability can include populating a user map store 46 (corresponding to the authentication module 42) and a resource map store 48 (corresponding to the authorization module 44). The stores 46 and 48 (as well as other data stores shown in FIG. 2) can comprise databases, file systems, or other suitable storage components. The various modules and stores shown in FIG. 2 and described herein can be embodied in software or other machine-readable instructions stored on machine-readable storage media. The data stores may be located within the apparatus 12, or reside on a remote device such as a database, file server, and the like.

The user map store 46 can be linked to the resource map store 48 (shown symbolically by an arrow in FIG. 2), and can be populated with permission properties that map user/entity/group objects to resource objects (such as local network resources) that are specified in the resource map store 48. Types of relationships can be specified using the user/entity/group objects and resource objects, such as owner, access rules that determine which users/group/machines have what kind of access to which local resources, and so on. In an embodiment, the structure of the user map store 46 and the resource map store 48 can be based on an LDAP framework. Additional details regarding the operation of the authentication module 42 and the authorization module 44 will be provided later below, and it is to be appreciated that these specific implementations of the authentication and authorization process are merely for purposes of illustration and explanation.

In one embodiment, the apparatus 12 can implement Authentication, Authorization and Access (AAA) or Extranet Access Mechanism (EAM) features, such as single sign-on functionality. This allows users of the system 10 to authenticate only once, yet gain access to multiple secured back-end systems that individually would each require a separate authentication process. Once a user has initially authenticated to the apparatus 12, any requests to access a restricted back-end system can be fulfilled automatically by the apparatus 12. In such cases, an embodiment of the apparatus 12 can invisibly provide the appropriate login credentials required to access each particular secured back-end system in a seamless process (e.g., "pass through authentication").

A data shaping module 50 has functionality that analyzes, rewrites, merges, separates, or otherwise alters data passing through the apparatus 12. Modification of data by the data shaping module 50 can be based on both a transaction at a single point in time or the cumulative results of prior transactions that form a multi-part transaction over time, as the state(s) of such transactions are read in from the transaction logs. Some of this functionality is static and built into the data shaping module 50, while other functionality is flexible and programmable via external user-supplied data rules (stored in a data rules store 52) that are parsed in via a parsing application program interface (API) module 54.

Static functionality includes the ability to analyze, sanitize, and rewrite hypertext markup language (HTML), dynamic HTML (DHTML), Flash, Java, or other content that should be or can be modified. This static functionality can also include a group of atomic data manipulation functions and tools that can be called upon by external data rules as translated by the parsing API module 54.

The flexible or dynamic data shaping functionality of the data shaping module 50 can be created at a high level via external data rules stored in the data rules store 52. This dynamic data shaping functionality can include, but not be limited to, extensible markup language (XML) tag markup, codification/classification of data elements into standard dictionary terms for electronic data interchange (EDI), reconciliation and creation of metadata out of various disparate data sources, and the like.

In an embodiment, the parsing API module 54 presents a high-level scripting interface to administrators of the business to enable them to automate, manipulate, and customize the internal functionality of the data-shaping module 50. User commands are translated into an intuitive high-level data rule language that are sent to the parsing API module 54 for translation for and execution against the internal functions within the data shaping module 50, or otherwise parses the syntax of the data rules that the various modules can understand and act upon.

The apparatus 12 can include an auditing module 56 to selectively audit data and transactions that pass through the apparatus 12. A reports module 58 can create static and dynamic reports 60 based on audit logs 62. For instance, the auditing module 56 can obtain/create information such as which user, from where, at what time, accessed what data, from where, how, what was done, how was the data manipulated or processed, who should be informed of this transaction, and so on, and then store this information in the audit logs 62. The reports module 58 can then create the reports 60 based on the audit logs 62, with an example report showing who is accessing a particular internal resource, marking the content and status of scheduled electronic exchanges with remote partners, or providing other types of transaction analysis. It is noted that data transaction history can be recorded by the auditing module 56, stored in the logs 62, and used by the reports module 58 and data shaping module 50. Transactional history may be customized to record data in the audit logs 62 in a variety of formats to allow compatibility with popular reporting and data analysis systems.

The system utilities module 66 can perform various utilities functions, including a name translation of non-routable internal web resources (e.g., 192.1680.11 or //hrmanual) or non-routable non-web resource (e.g., email or file systems) to a standard Internet-routable external resource (e.g., safeweb.companyabc.com/hrmanual/). The system utilities module 66 is also responsible for rewriting any external network links to route all such requests back through the apparatus 12 as described below. Thus, the systems utilities module 66 can include a proxy component to reformat the electronic data from a first protocol to a second protocol. This includes typical HTTP and FTP requests for network resources coded in component scripting languages such as HTML, JavaScript, etc. An agents module 68 accesses customized agent scripts 64 that are scheduled to execute automatically based upon time, connection, or other trigger events. Once created and running, such scripts can automatically access data, analyze it, operate upon it, and so on per the scriptwriter's conditions. The results are then provided via web pages, files, e-mail, database updates, or via other automated notification and customization techniques 74. The agents module 68 can be communicatively coupled to the other modules to combine, automate, and schedule multiple commands used for operation of the apparatus 12.

A local management module 70 enables administrators or a local information technology (IT) department 76 to configure, manage, and customize the appliance 12. The IT department 76 can perform activities such as creating or updating the user map store 46 and the resource map store 48. The IT department 76 can also view reports 60, audit logs 62, and edit, create or delete data rules store 52 and agent scripts 64.

The apparatus 12 further includes a remote management module 72 to enable outsourcing of the management and customization of the apparatus 12 to outside remote consultants 78 or other parties. This remote management allows the consultant 78 to monitor, update, diagnose, or solve potential issues, and also allows the outsourcing of future services such as intrusion detection and quality of service (QoS) monitoring. Either or both of the management modules 70 or 72 are capable to enable flexible extensions of new functions.

The various data stores previously described above will be further described next. The user map store 46 comprises a data store of all users/entities that have permission to access the system. These comprise objects having a security model hierarchy with various properties that determine the exact conditions and constraints that a particular entity has on using the apparatus 12 to access and work with private internal intranet resource objects (or simply "resources"). Examples of resources that can potentially be accessed include, but are not limited to, files, databases, applications/programs, file systems, intranet pages, electronic records, or other data and the like. Properties included in the user map store 46 include such items as username, password, last failed login, last successful login, last password, and the like.

The audit logs 62 comprise a data store of raw audit information for all the data processing, manipulation, and other transactions that occur in the apparatus 12. The auditing module 56 can determine the source, type, resolution, and frequency of what information is captured and stored in the audit logs 62.

The reports 60 comprise a data store that can contain specific reports that are both static and dynamic in nature. These reports can be made visible via the Internet 32 and downloadable in HTML format, as well as other formats such as text and PDF formats as well. The agents 64 comprise a data store that keeps a library of code of all automated agent scripts, along with code management metadata of ownership, sharing, versions, and so on.

The data rules store 52 comprises a data store containing applicationspecific data rules that can dictate how data is shaped as it passes through the apparatus 12. These rules can be grouped into sets based on criteria such as the data operated upon, the user/partner receiving the processed data, or the data application used. For example, a claim processing company may have several distinct data rule sets in the data rules store 52 that dictate how to map their internal data systems into several standard data formats for electronic interchange with business partners 38, such as banks, insurance companies, brokers, hospitals, government agencies, etc. The resource map store 48 comprises a data store that contains resource objects organized into a security model hierarchy, along with properties on each such as accessibility, type, and the like that can be used to both determine security and use.

Figure 3:
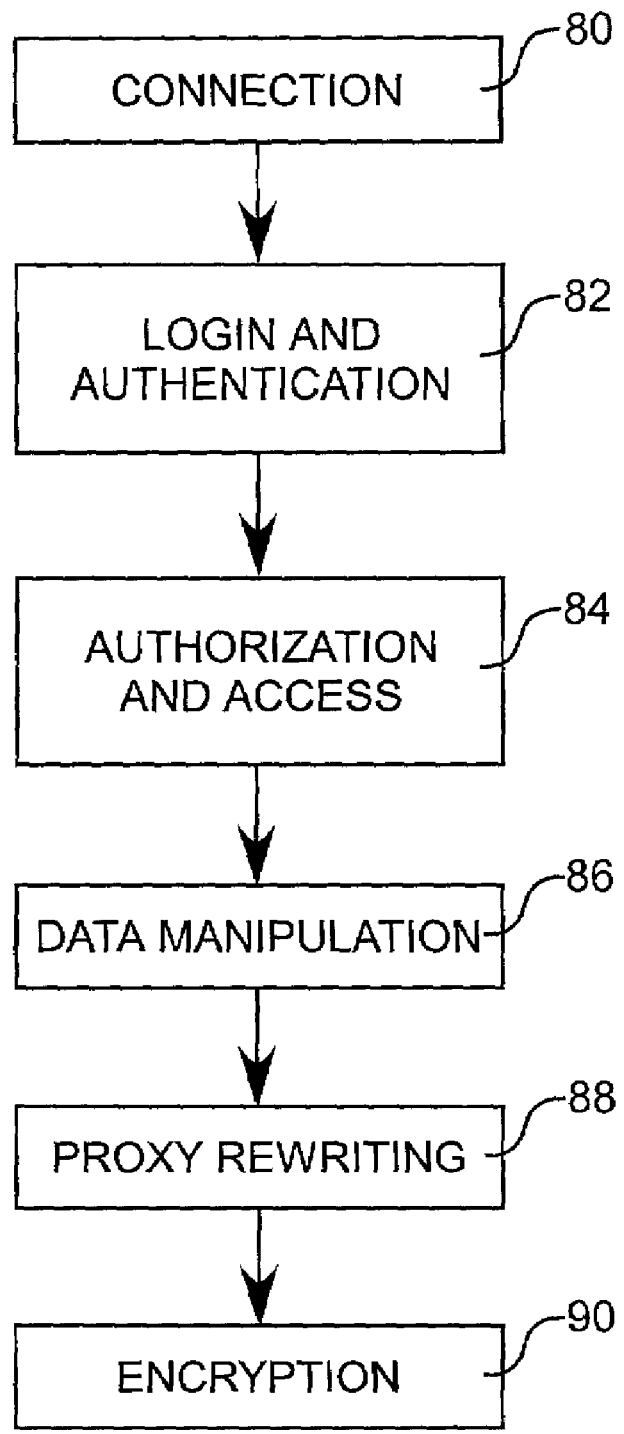
FIG. 3 is a flowchart illustrating operation of the apparatus of FIGS. 1-2 in accordance with an embodiment of the invention.

FIG. 3 is a flowchart illustrating operation of an embodiment of the apparatus 12 of FIGS. 1-2. For purposes of explanation and illustration, the operations shown in FIG. 3 will be described in the context of a remote user (such as the mobile user 34, the home user 36, or the business partner 38) who attempts to access another business' computer system via the public Internet 32. In this regard, the remote user can operate a machine (such as a PC or laptop) that communicates with one or more machines in the business, via the apparatus 12.

Beginning at a block 80 in the flow chart of FIG. 3, connection to the apparatus 12 occurs. In one embodiment, this may be done when the remote user opens a web browser from any computer at home or on the road (such as a when a patient connects to a hospital's computer system to view his/her medical records under the HIPAA), or at the business partner's 38 premises (such as when an insurance agent connects to the hospital to verify the patient's treatment), or at some other location. Connection between the remote external user and the apparatus 12 is largely via HTTPS in one embodiment. Connection between the apparatus 12 and the local internal data source may be performed via HTTP, file transfer protocol (FTP), email protocols (SMTP, POP, IMAP), network file protocols (SMB, NSF, etc.), or other suitable protocols. At the block 80, connections also may be refused by IP address, time of day, and the like. Data transmitted over such connections may be manipulated to match to specific formats such as XML or EDI.

Assuming for purposes of illustration that the business who's computer system is to be accessed is named "Company ABC," then the remote user uses the web browser to enter a URL address (or other address) that is being proxied to the apparatus 12, such as a URL address of "safeweb.companyabc.com." In other words, Company ABC has established a site on the public Internet 32 through which it makes its internal private intranet 24 available to remote users-the site is secure in that all communications is routed through the apparatus 12 (e.g., via use of the "safeweb" identifier in the login address). The remote user may enter a HTTPS prefix via the web browser or be redirected there when connecting to this website, thereby resulting in the secure encryption of data exchanged with the apparatus 12 (via use of 128-bit SSL encryption or PKI encryption, for instance).

Upon completion of connection, the remote user can proceed through a login and authentication process at a block 82. In the block 82, the authentication module 42 can present the remote user with a username/password login page. The validation can comprise verification of the username/password combination with other account restrictions such as expiration, lockout after multiple failed logins, restrictions on date/time windows, restrictions based on domain name system (DNS) domain name or internet protocol (IP) address or other address, or other factors. In some embodiments, authentication may be two-factored or more by challenging the remote user with a one-time password (OTP) system such as the SecureID™ card system or with biometric devices/systems. In one embodiment, the user is authenticated against a central LDAP server for rights, permissions, and group membership that follow the user per session. At the block 82, the remote user can also be presented by authentication module 42 with the ability to optionally change passwords, retrieve passwords via email, review last login date/time, and the like.

If the user successfully enters a username and password, then authorization and access is performed at a block 84. Based upon the authentication at the block 82, the user is presented with a web page at the block 84 that organizes all of the internal intranet 24 resources that are available to the remote user. Thus, the remote user can access (e.g., "surfs") authorized intranet web resources (or other non-web resources such as email and file systems) as if within the internal intranet 24, via a web-based point and click interface, by entering a URL address (or other address) of a particular resource, automatedly via a remote SSL agent, according to various embodiments.

In an embodiment, the authorization module 44 checks user permissions and resource access control lists for each request for private internal resources, so as to determine if the remote user's request for the resource should be processed or if an error message should be delivered. Because this operation may be invoked with each request in some embodiments, authorization may be streamlined via tokens that quickly map and resolve security model permissions. Thus, the remote user may "click" on various intranet data resources to access them seamlessly via this pass-through login process that can originate from the LDAP server or database.

If the user clicks on a particular resource that is listed on the page and the resource is determined by the authorization module 44 to be one that the user is authorized to access, then the requested resource is retrieved from its storage location (such as from a database or file system). The retrieved resource is passed from the internal intranet 24 to the apparatus 12, where the data shaping module 50 performs various data manipulation operations on the retrieved resource at a block 86. In other words, data manipulation at the block 86 can be performed on "data in motion."

The data manipulation at the block 86 can include one or more different types of data shaping operations, which in one embodiment can include rules-based dynamic manipulation of high-level content (based on fixed or programmable data-manipulation rules). Dataflow auditing can be performed to audit data as it "travels along the wire," for both high-level and low-level content in data packets. Dataflow markup can be performed to reformat the data to an intermediate format or other format that can be processed by the remote user's machine that requested the data. Dataflow analysis, including statistical analysis, error detection and correction, and application of logic rules, may be performed. Dataflow analysis or other data manipulation at the block 86 can also include filtering data based on a minimum need-to-know basis (e.g., data can be filtered in transit according to minimal visibility rules, business security models and mandated privacy regulations) and auto-correction of data. It is to be appreciated that these various data manipulation operations are merely illustrative of operations that may be performed by the data shaping module 50 and that other data shaping operations (or variations and combinations thereof, such as recording electronic data and derivatives thereof) may also be performed. Further details of the data manipulation at the block 86 will be provided later below.

After or concurrently with the data manipulation at the block 86, proxy rewriting is performed by the system utilities module 66 of FIG. 2 at a block 88. In general, proxy rewriting at the block 88 involves modification or replacement of links or addresses in the retrieved resource to ensure that all subsequent communication passes through the apparatus 12. For instance, a retrieved resource that is sent to the remote user may include a hypertext link to a page in the private intranet 24 or to some other location. If proxy rewriting is not performed at the block 88, then the remote user's web browser might bypass the apparatus 12 when the remote user clicks on the hypertext link. If proxy rewriting is performed at the block 88, however, then all such subsequent requests are ensured to pass securely (and anonymously in one embodiment) through the apparatus 12.

One embodiment of the apparatus 12 rewrites display and scripting languages at the block 88 according to various fixed syntax rules, but more particularly also rewrites the addresses in the high-level data (e.g., in the data content) itself. The system utilities module 66 or other component parses through the retrieved resource, such as a web page, and rewrites or replaces the links or addresses that it finds. In one embodiment, this involves opening up each web page, breaking it down into constituent components (e.g., HTML, JavaScript, VBScript, Cascading Style Sheet or CSS, Java, Flash, and so on), and rewriting all links to keep the remote user routed through the apparatus 12. It is noted that the data shaping module 50 or other parsing component of the apparatus 12 can also perform the examination and manipulation of high-level content of the requested resource.

In an embodiment, additional operations may be performed at the block 88. As one example, multi-protocol proxy/gateway rewriting may be performed at the protocol level to rewrite distinct protocols, such as those used for email and file access, into web-based protocols for access via a only a web browser. As another example, multi-protocol proxy/gateway rewriting may be performed to proxy all protocols at a lower packet level via a traditional proxy such as a SOCKS v5 proxy or via a packet level encryption such as that enabled by IPSec. Although traditional proxies and packet level encryption require some modification of the remote browser or computer, they can enable full access to any internal resources such as client-server applications like Microsoft Outlook™.

The user may access both web resources and non-web resources at the block 84, and then data manipulation and proxy rewriting can be performed at the blocks 86 and 88, respectively, as described above. Web resources can comprise any network resource (such as data or applications) that run on a traditional web server and is accessed with a web browser. Such web resources include static and dynamic web pages for both content and applications, and are typically written in a combination of HTML, JavaScript, VBScript, CSS, Flash, or Java on the client side. When the remote user requests a local web resource, the apparatus 12 fetches the web page, breaks it open into constituent languages, analyzes it, and rewrites and sanitizes all references to external links to ensure that all network traffic is routed through the apparatus 12. Because the analysis, rewriting, and sanitizing of all of these various web languages can be difficult, an embodiment of the apparatus 12 uses a distinct parser for each web language to account for the different behavior of each web language. Moreover, each parser may be permissive and sufficiently sophisticated to account for different behavior of these languages based on browser manufacturer, browser version, operating system, or web page syntax.

Non-web resources comprise network resources that cannot normally be accessed with only a browser. Typically, access to such resources requires a special client application independent of a web browser, such as Outlook™ or Eudora™ for email resources. For these non-web resources, the apparatus 12 may be viewed as a protocol gateway-an embodiment of the apparatus 12 translates non-web protocols such as POP/SMTP/IMAP (for email), SMB (for Microsoft™ network file sharing), and so on into secure web protocols such as HTTPS that can be delivered to any authorized user with a web browser. In this manner, remote users can access not only web server applications and data via the apparatus 12, but also email, files, and other resources with only their web browser in one embodiment, thereby preserving the benefits of portability.

It is noted that in an embodiment, data manipulation may occur anytime after authorization is successful, and not just between authorization and proxy rewriting as shown in FIG. 3. Examples include single sign-on (where username/passwords are transparently rewritten and users are automatically logged-in, as required by distinct internal applications or translating a raw data file into a PDF report or into a structured XML data file as the data stream passes through the appliance 12). It is further noted that auditing can include recording all aspects of each of these discrete operations, although it is not explicitly shown in FIG. 3.

Next at a block 90, the data is encrypted and sent through the border firewall 22 to the machine of the remote user that requested the data. In an embodiment, the apparatus 12 is able to maintain state/memory across multi-part transactions. That is, the apparatus 12 is able to process multi-part electronic transactions that occur over a period of time, with each discrete step potentially depending upon the previous step in the overall transaction set. Thus, when the encryption occurs at the block 90 (as well as when other operations occur in the various blocks of FIG. 3), such operations in some instances are being performed on a particular part of a multi-part transaction. These operations can then be repeated when the subsequent parts of the transaction are ready to be performed.

Figure 4:
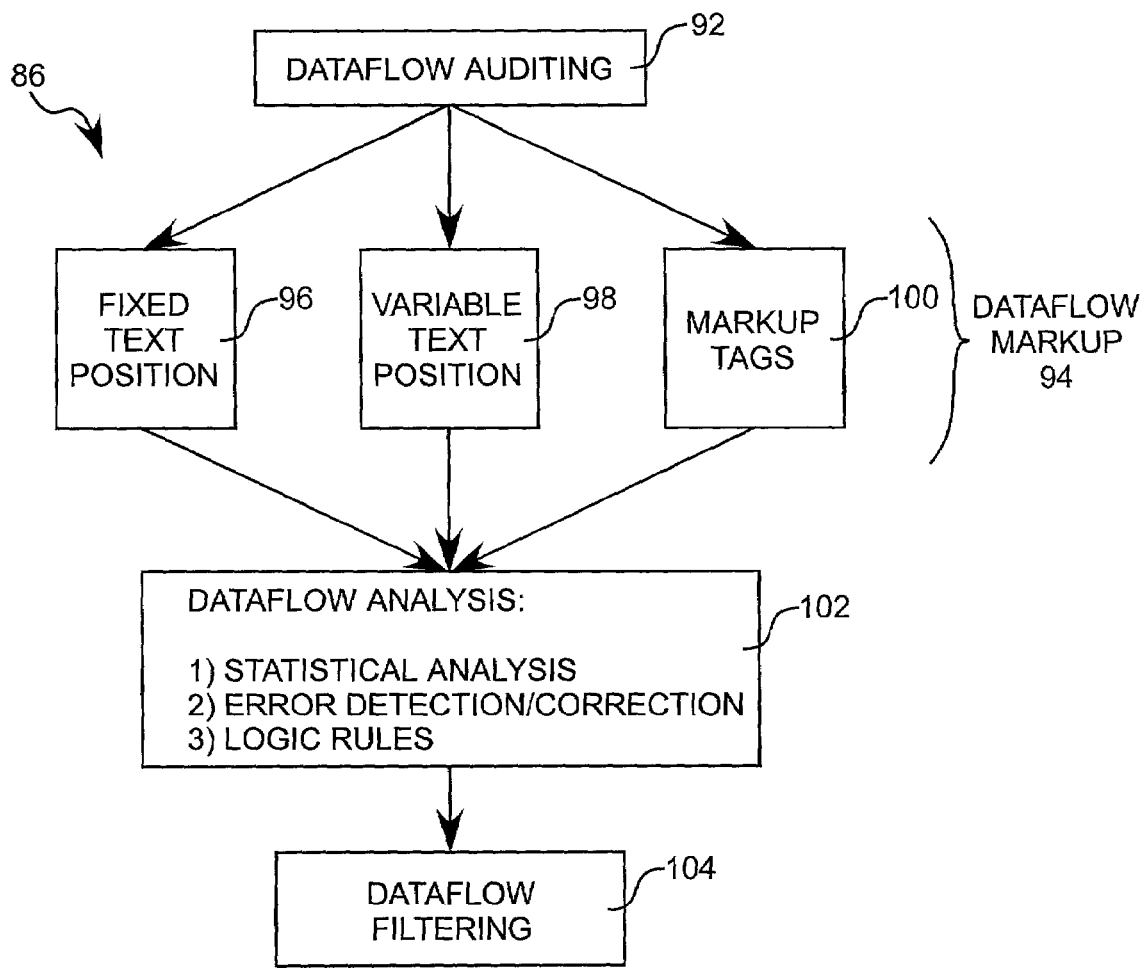
FIG. 4 is a flowchart illustrating examples of data manipulation operations of the flowchart of FIG. 3 in greater detail in accordance with an embodiment of the invention.

FIG. 4 is a flowchart illustrating examples of data manipulation operations (from the block 86) of the flowchart of FIG. 3 in greater detail in accordance with an embodiment of the invention. More particularly, the flowchart of FIG. 4 illustrates dataflow auditing, dataflow markup, dataflow analysis, and dataflow filtering, which in one embodiment may be based on fixed and/or programmable data manipulation rules embodied in software or other machine-readable instructions stored on a machine-readable medium. While the flowchart of FIG. 4 shows these operations in a specific order, it is to be appreciated that various embodiments of the apparatus 12 may perform these data manipulation operations in any suitable order. Moreover, it is to be appreciated that various embodiments of the apparatus 12 may perform less, more, or different data manipulation operations than what is shown in FIG. 4. For instance, many more types of data manipulation operations may occur for both structured and unstructured data. The data could be translated from a raw data file into a formatted PDF report or formatted according to wireless markup language (WML) for display on a small screen mobile device. It should also be noted that unstructured data (such as instant messages, facsimiles, and voice mail) can be rewritten, embedded in structured data files (such as attachments to medical files), and/or proxied into a web-viewable format (e.g., voice mail to a common format understood by a browser plug-in such as Real Audio™). The data in transit (whether transformed or in original form), as well as the manipulated data, may be stored in one or more memories, mass storage devices, or other machine-readable storage media.

Beginning at a block 92, in many applications it is often necessary to audit all data exchanges in a transaction-like format. For example, a health provider may send a private medical record with sensitive information to various business partners like other health providers, claim management companies, a bank for claim payment via automatic deposit, and an employer's HR department. A good auditing system for such data transactions are now mandated by law (e.g., HIPAA) and would typically record what medical data components were sent to which entities at what time for what purpose. Under HIPAA, a patient has some rights for visibility of these records as well as to restrict who has access to this private medical information (e.g., drug company marketing departments).

To create such audit trails of all such data exchanges between two such business entities, two simple methods are usually used by existing systems. First, the audit data is stored along with the main data. This is uncommon and often inaccurate as electronic data is repeatedly exchanged/processed, and the audit data may not be kept updated with each transaction to reflect this. Second, the data (such as a patient record) is often stored in a database. This data can be written and read from the database via database programming languages that not only read to/write main data but can also create audit logs of each read/write command. The problem with this approach is that such audit logs generally only record when and what data was directly read from/written to the database, and not the more important audit information, such as where the data went, to whom or even when it was sent over the wire to remote business partners. Once data is read from the database, it can easily be electronically copied, manipulated, and exchanged with external systems without any centralized control or auditing, such as with medications or transactions.

An embodiment of the apparatus 12 addresses these problems. Instead of the traditional data transaction auditing described above that takes place on the server or database, the apparatus 12 actually audits high-level data dynamically at the block 92—as the data travels over the network routed through the apparatus 12. Some devices such as firewalls or packet sniffers audit data as it travels over a network but only at a very low network/packet level for security purposes. An embodiment of the apparatus 12 can also audit data at the block 92 as it travels over the network at both a low network/packet level for security or performance purposes, but more importantly audits data of transactions at a high content level for the purposes of facilitating business data exchange, such as a medical patient record.

The ability to dynamically process data as it flows over the network through the apparatus 12 located between two business partners to facilitate data exchange in a variety of ways is a unique feature of the apparatus 12. The apparatus 12 facilitates data exchange by processing the data in transit via: encryption, auditing, analysis, markup, and the like. Dataflow auditing is just one example of this unique feature of the apparatus 12. In an embodiment, the auditing module 56 performs the operations at the block 92 to provide source, destination, content, time, and other audit information for the audit logs 62. This may be done by software of the auditing module 56 that interprets the data stream passing through apparatus 12 as discrete high-level transactions, as well as consulting lookup tables or databases if necessary to further identify auditable properties of the transaction, and then storing such audit information in the audit logs 62 for generation of the reports 60.

Dataflow markup may be performed at 94, such as in situations where two business entities that wish to exchange data typically have to re-format their data according to some common intermediate format. Almost every business has its own internal database. Even if both businesses store patient records, they will typically have differently data elements, formats, and organization of patient record data or other data. In order for these two business to electronically exchange data between these two different database systems, they will have create a standard intermediate format that identifies all the required data and structures it in a common, logical, and consistent form.

Typically in existing systems, each business will have to write programs to extract data from their internal systems and re-format it into the standard intermediate form in order to share it with external business partners. In addition, they will have to write programs to read data stored in the standard intermediate form and re-format it for input into their internal system. These programs are complicated by the fact that the internal patient record data may be spread across many internal databases from different vendors that understand different programming languages. Each of these programs on distinct internal database servers must then feed their output to another main program, which then combines all the data into the external standard intermediate format that can subsequently be sent to external business partners.

The external intermediate format used to exchange data, such as patient records between business partners, is commonly structured in one of three ways at 94 by an embodiment of the apparatus 12. First at a block 96, a data structure can be determined by fixed text position in a flat data file where each row represents a particular patient record. For example, characters between column 0 and 7 inclusive can be defined to be the eight consecutive integers that make up a social security number (SSN) without any hyphens, while characters between 8 and 32 inclusive are the left-justified upper case alphabetic characters that represent the patient's last name. In addition, a header record and trailer record typically surround any records transmitted containing information such as the sender and receiver IDs, data format version, error checksums, and the like.

Second at a block 98, a data structure can be determined by variable text position in a flat data file where each row represents a particular patient record, and a defined separator (e.g., |) demarks the boundaries between distinct data elements. For example, the first field can be defined as the integers of patients' SSN, and the second field includes the upper-case characters of the last name. Header records and trailer records also surround any data records sent as a transaction.

Third at a block 100, a data structure can be determined by markup tags rather than a position within a flat data file. For example, a complete patient record can be defined as everything concatenated within a starting <PATREC> and an ending </PATREC> markup tag. Within this patient record, individual data elements can be embedded within starting <SSN> and ending </SSN> tags. In an embodiment, XML may be used as the technology to structure, define, parse, and exchange such information. An example patient record may thus appear as: <PATREC><SSN>480843847</SSN><LNAME>SMITH</LNAME>... </PATREC>

According to an embodiment, any internal data that passes over the network through the apparatus 12 can be restructured and marked-up to be compliant with one or more external standard intermediate formats that remote business partners require (including EDI standards such as those mandated by HIPAA, XML or other data exchange formats), using any of these three common markup techniques shown at the blocks 96-100 or other techniques. While existing art dictates that businesses create distributed applications on each data source and try to coordinate their aggregation, the apparatus 12 allows businesses to leave their internal IT production systems undisturbed by centralizing all e-commerce data manipulations in one convenient secure location for ease of implementation, consistency and reuse. For instance in an embodiment, the apparatus 12 may be programmed to choose from a selection of different intermediate formats and then to perform the required re-formatting of the data into the selected intermediate format, based on a correlation of the particular entity with database entries that map acceptable intermediate formats for each particular entity.

In addition to merging, editing, standardizing, and marking up internal data to external data formats for e-commerce as described above at 94, an embodiment of the apparatus 12 can also perform dataflow analysis at a block 102, including statistical analysis, error detection/correction, and various data logic rules to increase the accuracy, efficiency, and value of any data exchanges between business partners. Here are a few concrete examples of dataflow analysis at the block 102 that can be performed by an embodiment of the apparatus 12, and it is to be appreciated that there are many other opportunities to build in dataflow analysis functionality into the apparatus 12, and that these are just three illustrative examples:

Statistical analysis: Imagine patient records with diagnosis, treatment, prescription, and financial information sent over the network through the apparatus 12 from a hospital to an insurance company. Imagine further that these four types of data originated from different internal servers. When all such data is passed through the apparatus 12, another type of data (e.g., auditing timestamps and the like) can be created and combined with various programmable rules to create new useful business intelligence, such as a real-time report of the financial efficiency of various treatments on specific medical conditions, with the report having the ability to detail the pharmaceutical component of treatment and costs.

Error detection/correction: A huge problem with any automated electronic data exchange system is the possibility of errors that can creep into the data, propagate undetected, and result in costly or even dangerous business decisions. Imagine a data entry operator at a hospital mistypes 951 instead of 961 as diagnosis code on a medical record, resulting in an underpayment on the claim, or worst, inappropriate follow-up medical care. As data passes through the apparatus 12, the data can be passed through custom error and quality filters that detect, flag, standardize, correct, reject or otherwise ensure that the data is as standard, complete and accurate as required. These results can also be fed back into the originating databases to clean up their data. For instance, filters can be programmed with data sets/rules to detect potentially dangerous situations where patients who are prescribed with antidepressant drugs are also prescribed with alcohol-based drugs.

Logic rules: Various rules can be applied to the data as it passes through the apparatus 12 at the block 102 to create new derived data based on the original data and specific data rules. Various data streams to different partners can be correlated and logically tied together in a manner that accurately reflects true business operations. For example, suppose a claims management firm wants to send a bank a data file to effect automatic deposit for payments on a medical claim to an individual. This same claims management firm needs to obtain verification of the medical authorization as well as clearance from the underwriting insurance company before such payments should be made. Via various programmable logic rules in the apparatus 12, automatic deposit payments can be scheduled and triggered automatically once data feeds verifying medical and insurance authorization are received.

Next at a block 104, dataflow filtering may be performed for minimum need-to-know situations such as those as mandated by privacy regulations. For instance, a resource may be scrubbed or edited so that the remote user that requested the resource does not get to view the entire resource. Thus for instance, a patient may be allowed to see only the medical costs for treatment from his/her patient record, and may not be given access to the doctor's diagnosis (e.g., the doctor's diagnosis in the patient record may be deleted or masked from the patient who requested the record). Such atomic-level content filtering may be specified in the resource map store 48 in one embodiment.

In conclusion, current data interchange technology is still broken down into a number of distinct complex technologies including server and client software, hardware and operating system platforms, network, application and system security-not a complete modular network appliance device incorporating all these distinct components (which is a feature of one embodiment of the apparatus 12). This distinction is used as a basis by an embodiment of the apparatus 12 to provide a new approach to data interchange. Typically, businesses would have to independently research, specify, purchase, install, configure, program secure and integrate distinct hardware, software, client and server technologies in order to build data interchange functionality into their computer networks. In addition, many existing technologies are inflexible and often do not work with products from other vendors forcing customers to replace or build additional computer systems. An embodiment of the apparatus 12 embeds all these disparate complex technologies within a single modular network device that can be configured to solve common and specific data interchange problems with a simple, quick, low-cost, low-risk and flexible plug-in device that can optionally be remotely configured and managed.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while an embodiment of the apparatus 12 has been described herein as being implemented for facilitating the exchange of data between machines, it is to be appreciated that another embodiment of the apparatus 12 can be used as an "intelligent firewall" to protect an internal network (e.g., the private intranet 24) against external threats, restrict access to external web sites, and monitor and record traffic. In other words, an embodiment of the apparatus 12 may be used as a monitoring and surveillance device to intercept, filter, record, and report on all content passing through the apparatus 12.

The apparatus 12 is able to do this because it can receive an incoming encrypted SSL communication/connection, break open such an encrypted connection, examine high-level content (e.g., record, filter, audit, act upon specific content according to various rules, and so on), and re-establish the secure encrypted communication. This capability of the apparatus 12 can defeat a situation where, for instance, an outside party sets up a dummy external e-commerce web server/site with a secure payment page that allows an individual inside of a business to appear to be simply purchasing a book or airline tickets. In fact, the individual can upload any electronic information to the external web site in the completely unsuspicious context of a routine e-commerce transaction. Blocking all encryption to external web sites destroys the benefits/efficiencies of e-commerce and is a poor solution. In contrast, however, use of the apparatus 12 enables a business to still utilize the advantages of secure e-commerce, yet also provide precise knowledge and control over the electronic transmission of data.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a processor;
   a memory coupled to the processor, wherein the memory stores program instructions executable by the apparatus to:
   receive a set of user instructions for data conversion;
   translate the set of user instructions into a set of user-defined rules for data conversion;
   secure an authenticated connection between the apparatus and a first computer system;
   authorize an access to a second computer system over a private network; and
   transform a set of related electronic data from a first format to a second format during transit of the set of related electronic data between the first computer system and the second computer system, including:
   receiving the set of related electronic data from the first computer system in the first format;
   converting the set of related electronic data from the first format to the second format, including parsing the user-defined rules and structuring the set of related electronic data according to the user-defined rules; and
   sending the converted set of related electronic data to the second computer system in the second format.

2. The apparatus of claim 1, wherein the set of related electronic data includes one or more programs.

3. The apparatus of claim 1, wherein, in converting the set of related electronic data from the first format to the second format, the program instructions are further executable by the processor to:
   classify elements of the set of related electronic data into standard dictionary terms for electronic data interchange.

4. The apparatus of claim 1, wherein the program instructions are further executable by the processor to:
   audit high and low level portions of the set of related electronic data.

5. The apparatus of claim 1, wherein the program instructions are further executable by the processor to:
   re-format the set of related electronic data to an intermediate format prior to converting the set of related electronic data to the second format.

6. The apparatus of claim 1, wherein the first format comprises a non-web-based format, and wherein the second format comprises a web-based format.

7. The apparatus of claim 1, wherein the program instructions are further executable by the processor to rewrite a protocol corresponding to the set of related electronic data into a lower packet level protocol.

8. The apparatus of claim 1, wherein the program instructions are further executable by the processor to:
   obtain audit information corresponding to the set of related electronic data to be exchanged and to store the obtain audit information in an audit logs data store; and
   provide report information based on the audit information stored in the audit logs data store.

9. The apparatus of claim 1, wherein the first format is an e-mail format.

10. The apparatus of claim 1, wherein the first protocol is a file system protocol.

11. The apparatus of claim 1, wherein the apparatus is a network device configured to couple to a public network, and wherein the network device is configured to perform data-shaping operations on data in motion.

12. A method comprising:
   a network device receiving a set of user instructions for data conversion;
   the network device translating the set of user instructions into a set of user-defined rules for data conversion;
   the network device securing an authenticated connection between the network device and a first computer system;
   the network device authorizing an access to a second computer system over a private network;
   during transit of a set of related electronic data between the first computer system and the second computer system, the network device converting the set of related electronic data from a first format to a second format, wherein converting the set of related electronic data from the first format to the second format comprises parsing the user-defined rules and structuring the set of related electronic data according to the user-defined rules; and
   the network device sending the converted set of related electronic data to the second computer system in the second format.

13. The method of claim 12, wherein converting the set of related electronic data includes:
   classifying elements of the set of related electronic data into standard dictionary terms for electronic data interchange.

14. The method of claim 12, further comprising:
   auditing high and low level portions of the set of related electronic data.

15. The method of claim 12, further comprising:
   re-formatting the set of related electronic data to an intermediate format prior to converting the set of related electronic data to the second format.

16. The method of claim 12, wherein the first format comprises a non-web-based format, and wherein the second format comprises a web-based format.

17. The method of claim 12, further comprising:
   obtaining audit information corresponding to the set of related electronic data and storing the obtained audit information in an audit logs data store; and
   providing report information based on the stored audit information.

18. The method of claim 12, wherein the network device is configured to perform data-shaping operations on data in motion between a public network and a private network.

19. An article of manufacture, comprising:
   a machine-readable storage medium having instructions stored thereon that are executable by a device to:
   receive a set of user instructions for data conversion;
   translate the set of user instructions into a set of user-defined rules for data conversion;
   secure an authenticated connection between the device and a first computer system;
   authorize an access to a second computer system over a private network;
   during transit of a set of related electronic data between the first computer system and the second computer system, convert the set of related electronic data from a first format to a second format, wherein converting the set of related electronic data from the first format to the second format comprises parsing the user-defined rules and structuring the set of related electronic data according to user-defined rules; and
   send the converted set of related electronic data to the second computer system in the second format.

20. The article of manufacture of claim 19, wherein converting the set of related electronic data includes:

classifying elements of the set of related electronic data into standard dictionary terms for electronic data interchange.

21. The article of manufacture of claim 19, wherein the machine-readable medium further includes instructions stored thereon to:

audit high and low level portions of the set of related electronic data.

22. The article of manufacture of claim 19, wherein the first format comprises a non-web-based format, and wherein the second format comprises a web-based format.

23. The article of manufacture of claim 19, wherein the machine-readable medium further includes instructions stored thereon to:

obtain audit information corresponding to the set of related electronic data and store the obtained audit information; and provide report information based on the stored audit information.

24. The article of manufacture of claim 19, wherein the machine-readable medium further includes instructions stored thereon to:

perform data-shaping operations on data in motion between a public network and a private network.

* * * * *